UNITED STATES PATENT OFFICE.

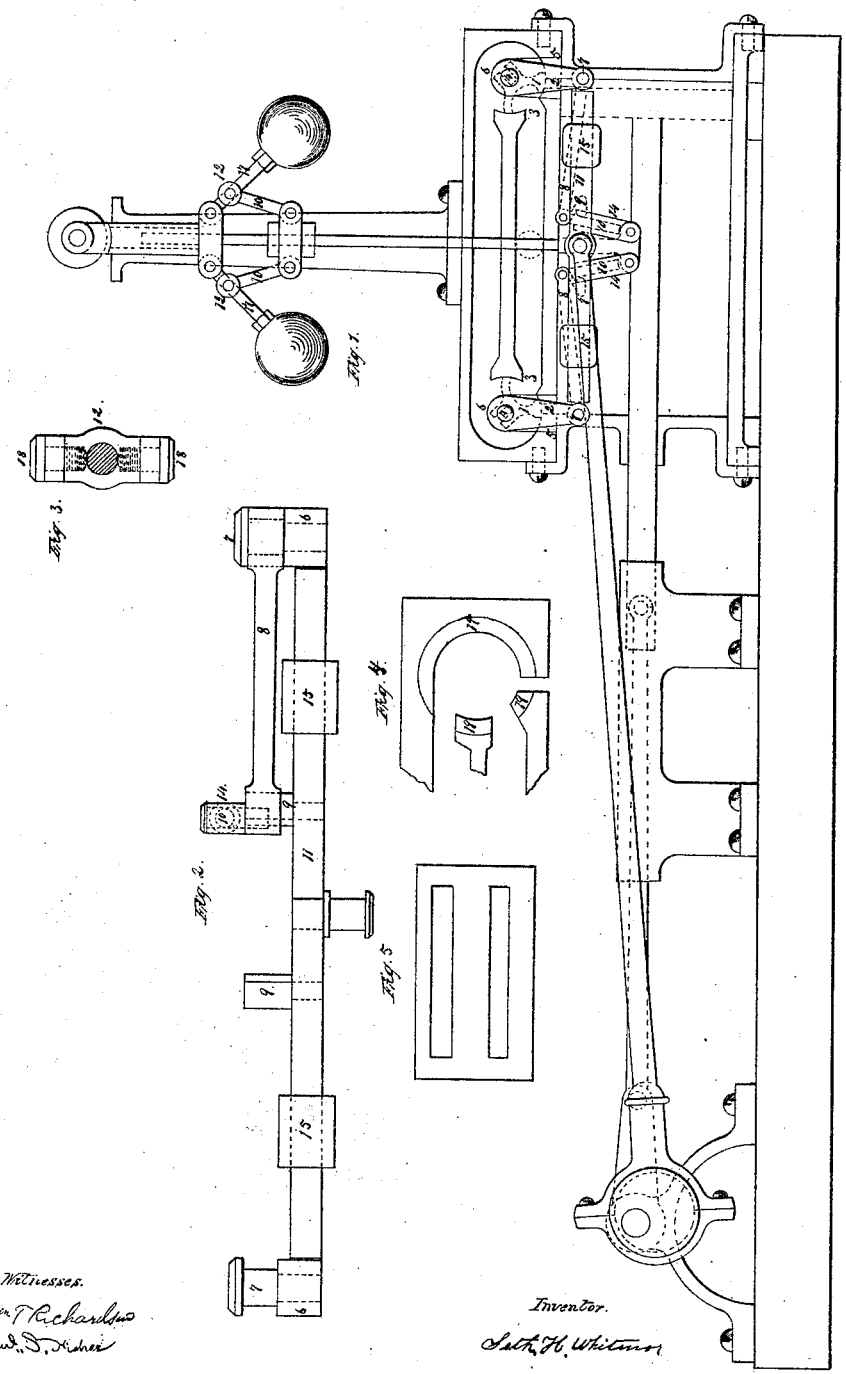

SETH H. WHITMORE, OF CINCINNATI, OHIO.

STEAM-ENGINE.

Specification of Letters Patent No. 31,500, dated February 19, 1861.

*To all whom it may concern:*

Be it known that I, SETH H. WHITMORE, of Cincinnati, Hamilton county, Ohio, have invented certain new and useful Improvements in Steam-Engines, of which the following is a full, clear, and exact description, reference being had to the accompanying drawings, in which like figures represent like parts of the engine.

My invention relates more particularly to the apparatus for admitting and shutting off the supply of steam to the engine, and for controlling or governing such supply; and consists of a cut off, simple in construction and effective in operation, which is brought directly under the control of the governing power, so that the admission of steam, shall correspond to and be regulated by the slightest variation of the speed of the engine.

In addition to the invention of the whole apparatus I have also improved several of the parts which bear relation to it.

In the accompanying drawings; Figure 1, represents a sectional view of the cylinder valves, valve openings, and the several parts of my improved cut off. Fig. 2, represents a top view of some of the parts of the cut off. Fig. 3, represents the mode of constructing the governor, by which I am enabled to increase or diminish its power by means of an adjustable arm or joint. Fig. 4, represents a sectional elevation of one of the valve openings showing an adjustable valve seat. Fig. 5, represents a side elevation of Fig. 4.

In Figs. 1 and 2; 1, 1 are the valves, 2, 2, the steam openings, 3, 3, the exhaust openings, 4, 4, the valve stems, 5, 5, the brackets, by which the outer end of the valve stems are supported, 6, 6, the cranks which operate the valves.

7, 7, are wrist pins attached to the cranks 6, 6, to which pins the long hooks 8, 8, are jointed. These hooks seize the catches 9, 9, which are fastened to and operated by the bar 11.

10, 10, are extension links sliding in the cylinders 14, 14, which links at certain stages in their motion disengage the hooks 8, 8, from the catches 9, 9.

The bar 11, besides carrying the catches 9, 9, also operates the exhaust by impinging against the cranks 6, 6.

In Figs. 1 and 3, 12, 12 are the adjustable joints of the arms supporting the governor arms.

The valves 1, 1, are made with a slot in the back so as to permit the valve stem to pass through, and fit loosely; or the valve stem may pass around the valve. The face of the valve itself forms a segment of a circle and it is fitted to the seat so as to make a steam joint. The seat may be the cylinder itself or it may be an independent, adjustable seat, made straight or conical, as shown at 19, 19, 19, in Fig. 4. The under side of the valve is cut out, as indicated by the dotted lines, so as to form a hollow throat or exhaust opening. The movement of the valve from 2 toward 3 admits steam to the cylinder, while its reciprocating movement from 2 toward 5 opens the exhaust. The movement of the valve is effected in the following manner. To the outer extremity of the valve stem the crank 6 is attached, which, when the valve is closed, hangs in a plumb line. At the lower end of the crank 6, the wrist 7, is attached, upon which the long hook 8 is jointed. This hook is operated by the catch 9 upon the bar 11. A plunger 10, is fastened or jointed to the hook and works in a cylinder 14; the lower end of which cylinder is jointed to the governor rod 13. It is manifest that when the plunger strikes the bottom of the cylinder the hook 8, will be lifted from the catch 9, and this will be effected sooner, if the governor rod be drawn up. When the hook is disengaged from the catch the valve is instantly closed by a weight or any other suitable device. The bar 11, which derives its motion from the main shaft, slides in the guides 15, 15, and by the same movement of the bar which opens one valve (by the catch and hook) it impinges against the lower end of the crank at the other end of the cylinder, presses it outward, and opens the exhaust. Meanwhile the catch has again seized the hook, and, as the bar returns, the valve is drawn back, closing the exhaust and opening the steam passage.

The cut off above described may be adjusted by hand, by means of a lever, screw or equivalent device applied to the rod 13, by means of which the rod and with it the cylinders 14, 14, may be raised or lowered; or, the cut off may be brought directly under the control of the governor, by operating the rod 13, by the governor in the ordinary way as shown in Fig. 1, the governor in turn being operated by the main shaft by means of the ordinary gearing. When the governor and cut off are thus connected their joint operation will be as follows. As the engine increases its speed, the governor balls will rise and draw up the rod 13 and with it the cylinders 14, 14, so that the plungers will reach the bottom of said cylinders, and lift the hooks 8, 8, from the catches 9, 9, before the engine has made full stroke. As soon as the hooks are thus disengaged from the catches the valves close instantly and cut off the supply of steam. This may occur at any point in the stroke and corresponds exactly to the wants of the engine and to its varying rate of speed. On the other hand, as the speed of the engine decreases, the balls and rod 13 descend, the cylinders are lowered, and the plungers do not lift the hooks from the catches and permit the valves to close until the engine has made nearly or quite full stroke.

In order to adjust the effective force of the governor, steady its motion, and give it greater or less power by varying the angles within which the balls revolve, I permit the arms 16, 16, to slide upon the governor arms 17, 17 as shown at 12, 12 Figs. 1 and 3, adjusting their position upon the governor arms by means of the screws 18, 18.

It is evident that many devices may be used as equivalents for the various parts of the above described cut off. Thus, instead of the plunger and cylinder, a slotted arm may be employed effecting the purpose, when a pin attached to the hook 8 reaches the bottom of the slot, or the slotted arm may be reversed, disengaging the hooks and tripping the valve by traction. So, the position of the catches on the bar 11, may be varied and the hook may be made to serve the double purpose of opening the valves for the admission of steam to the cylinder, and of receiving from the bar, on its return movement, an impulse which will open the exhaust.

Having thus fully described the nature purpose and operation of my invention, I do not claim broadly the principle of cutting off the supply of steam to an engine, at less than full stroke, but,

What I do claim as my invention and desire to secure by Letters Patent is.

1. The above described apparatus consisting of the sliding bar, the catches, hooks, plungers or lifters and rod 13 combined and arranged substantially as described for operating the cut off and exhaust valves of a steam engine.

2. The application, to the above apparatus arranged substantially as described of an automatic governor operating through the rod 13, to trip the cut off valves at any desirable point in the stroke.

3. The reciprocating bar 11, carrying the stationary catches for opening the valves and by its return movement opening the exhaust by impinging against the cranks 6, 6, substantially as described.

4. The plungers with their cylinders, or slotted arms jointed to the rod 13 for disengaging the hooks 8, 8, from the catches 9, 9, constructed substantially as described.

5. The hooks 8, 8, when combined with the cranks 6, 6, and operating in connection with the catches 9, 9, substantially as described.

6. The independent adjustable valve seat 19, 19, 19 in connection with the oscillating valves 1, 1, substantially as described.

7. The hollow throated valves 1, 1, when combined with the cut off arrangement described in the first claim.

SETH H. WHITMORE.

Witnesses:
  SAML. S. FISHER,
  WM. T. RICHARDSON.